US012730071B2

(12) United States Patent
Maddox et al.

(10) Patent No.: US 12,730,071 B2
(45) Date of Patent: Sep. 8, 2026

(54) MIRROR BASED LIGHT SHEET ILLUMINATION SYSTEM FOR LIGHT MICROSCOPY

(71) Applicants: The University of North Carolina at Chapel Hill, Chapel Hill, NC (US); Mizar Imaging, LLC, Woods Hole, MA (US)

(72) Inventors: Paul Samuel Maddox, Chapel Hill, NC (US); Joel Carter Smith, East Falmouth, MA (US); Bryan William Heck, Mebane, NC (US); Christopher T. Baumann, Dayton, OH (US)

(73) Assignees: MIZAR IMAGING, LLC, Woods Hole, MA (US); THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 565 days.

(21) Appl. No.: 18/125,519

(22) Filed: Mar. 23, 2023

(65) Prior Publication Data

US 2023/0304934 A1 Sep. 28, 2023

Related U.S. Application Data

(60) Provisional application No. 63/323,057, filed on Mar. 23, 2022.

(51) Int. Cl.
*G02B 21/06* (2006.01)
*G01N 21/64* (2006.01)
(Continued)

(52) U.S. Cl.
CPC ....... *G01N 21/6458* (2013.01); *G02B 17/006* (2013.01); *G02B 21/06* (2013.01);
(Continued)

(58) Field of Classification Search
CPC ....... G01N 21/6458; G01N 2021/6463; G01N 2021/6484; G01N 2201/06113;
(Continued)

(56) References Cited

U.S. PATENT DOCUMENTS 10,908,403 B2 * 2/2021 Knop .................... G02B 21/06
11,099,370 B2 8/2021 Maddox et al.
(Continued)

FOREIGN PATENT DOCUMENTS

CN 104121991 A 10/2014
DE 102019214929 A1 4/2021
JP 2018/066848 A 4/2018

OTHER PUBLICATIONS

Notification of Transmittal of The International Search Report and Written Opinion of PCT International Application Serial No. PCT/US2023/016116 dated Jul. 10, 2023.
(Continued)

*Primary Examiner* — Arnel C Lavarias
(74) *Attorney, Agent, or Firm* — Jenkins, Taylor & Hunt, P.A.

(57) ABSTRACT

Methods and systems for imaging a sample using fluorescence microscopy. High resolution lenses can be used for light sheet microscopy by tilting the excitation beam relative to the imaging optical axis. The excitation beam can be tilted using mirrors, instead of lenses, to generate the tilted illumination sheet. In some examples, a light path starts at a top downward-facing cone of light as it emerges from an optic fiber; a first off-axis parabolic mirror collimates in the x-axis, while a second off-axis parabolic mirror collimates in the y-axis, followed by the photomask to create four primary light sheets, which are then focused by a third off-axis parabolic mirror. As the four primary light sheets converge they create an interference pattern at an objective lens.

20 Claims, 13 Drawing Sheets

(51) Int. Cl.
*G02B 17/00* (2006.01)
*G02B 21/16* (2006.01)
*G02B 27/60* (2006.01)

(52) U.S. Cl.
CPC ..... *G02B 21/16* (2013.01); *G01N 2021/6463* (2013.01); *G01N 2021/6484* (2013.01); *G01N 2201/06113* (2013.01); *G02B 27/60* (2013.01)

(58) Field of Classification Search
CPC .. G01N 21/6486; G02B 17/006; G02B 21/06; G02B 21/16; G02B 27/60; G02B 17/02; G02B 17/06; G02B 17/0626; G02B 17/0636; G02B 17/0668; G02B 17/0673; G02B 21/00; G02B 21/0004; G02B 21/002; G02B 21/0032; G02B 21/0076; G02B 21/36; G02B 21/361
USPC ......................... 359/385, 362, 363, 368, 369
See application file for complete search history.

(56) References Cited

U.S. PATENT DOCUMENTS

2008/0277567 A1 11/2008 Doran et al.
2015/0198794 A1 7/2015 Rondeau
2018/0052314 A1* 2/2018 Brinkman .............. G02B 21/22
2019/0196167 A1 6/2019 Maddox et al.
2020/0408691 A1 12/2020 Vladimirov et al.
2021/0011269 A1 1/2021 Maddox et al.
2021/0325651 A1 10/2021 Tsia et al.

OTHER PUBLICATIONS

Samanta et al., “An overview of structured illumination microscopy: recent advances and perspectives,” Journal of Optics, vol. 23, No. 12, p. p. 1-19 (Nov. 19, 2021).
Extended European Search Report for European Patent Application Serial No. 23775676.2 (Feb. 26, 2026).

* cited by examiner

| Total Power Output | | | | | | |
|---|---|---|---|---|---|---|
| | 488nm/2.5V | 488nm/5V | 640nm/2.5V | 640nm/5V | Average | Throughput |
| Fiber | 4.5mW | 11.1mW | 7.4mW | 19.8mW | 10.7mW | |
| TILT | 1mW | 2.4mW | 1.8mW | 5mW | 2.6mW | 24% |
| LITE-SM | 3.3mW | 8.1mW | 4.9mW | 13mW | 7.325mW | 68.5% |
| Normalized to Beam Width | | | | | | |
| TILT | 0.21 | 0.51 | 0.39 | 1.1 | 0.54 | |
| LITE-SM | 2.5 | 6.2 | 3.8 | 10 | 5.6 | |
| Difference | | | | | 10.8-fold | |

MIRROR BASED LIGHT SHEET ILLUMINATION SYSTEM FOR LIGHT MICROSCOPY

CROSS-REFERENCE TO RELATED APPLICATIONS

This application claims benefit of U.S. Provisional Application Ser. No. 63/323,057, filed on Mar. 23, 2022, the disclosure of which is incorporated herein by reference in its entirety.

GOVERNMENT INTEREST

This invention was made with government support under Grant Number MCB1652512 awarded by the National Science Foundation. The government has certain rights in the invention.

TECHNICAL FIELD

This specification relates generally to fluorescence microscopes and more particularly to tilted illumination systems for fluorescence microscopes.

BACKGROUND

Typical single-molecule (SM) microscopes employ a single objective lens and illuminate the entire sample with high-powered laser light, resulting in unnecessary photodamage. In contrast, Light Sheet Fluorescence Microscopy (LSFM) employs a secondary excitation path to create a thin sheet of laser light that illuminates the sample from the side, illuminating only a small focal volume matched to the focal depth of the detection lens. This technique reduces light-dose and photodamage to the sample and limits the amount of out-of-focus light that contributes to the final image. Traditional LSFM, however, may be incompatible with the high-numerical aperture (NA) lenses used for super-resolution microscopy and SM imaging.

Accordingly, there exists a need to build upon the current available designs for LSFM.

SUMMARY

This specification describes methods and systems for imaging a sample using fluorescence microscopy. High resolution lenses can be used for light sheet microscopy by tilting the excitation beam relative to the imaging optical axis. This specification describes methods and systems for tilting the excitation beam using mirrors, instead of lenses, to generate the tilted illumination sheet. In some examples, a light path starts at a top downward-facing cone of light as it emerges from an optic fiber; a first off-axis parabolic mirror collimates in the x-axis, while a second off-axis parabolic mirror collimates in the y-axis, followed by the photomask to create four primary light sheets, which are then focused by a third off-axis parabolic mirror. As the four primary light sheets converge they create an interference pattern at an objective lens. The photon-efficiency and flexibility of this mirror-based design allow broader scope for super-resolution and other advanced imaging modalities. This document describes example systems using parabolic mirrors; however, in general, any appropriate type of mirrors can be used. For example, the systems can include other conic sections, spheres, ellipses, and/or hyperbolas.

DESCRIPTION

Figure 1A:
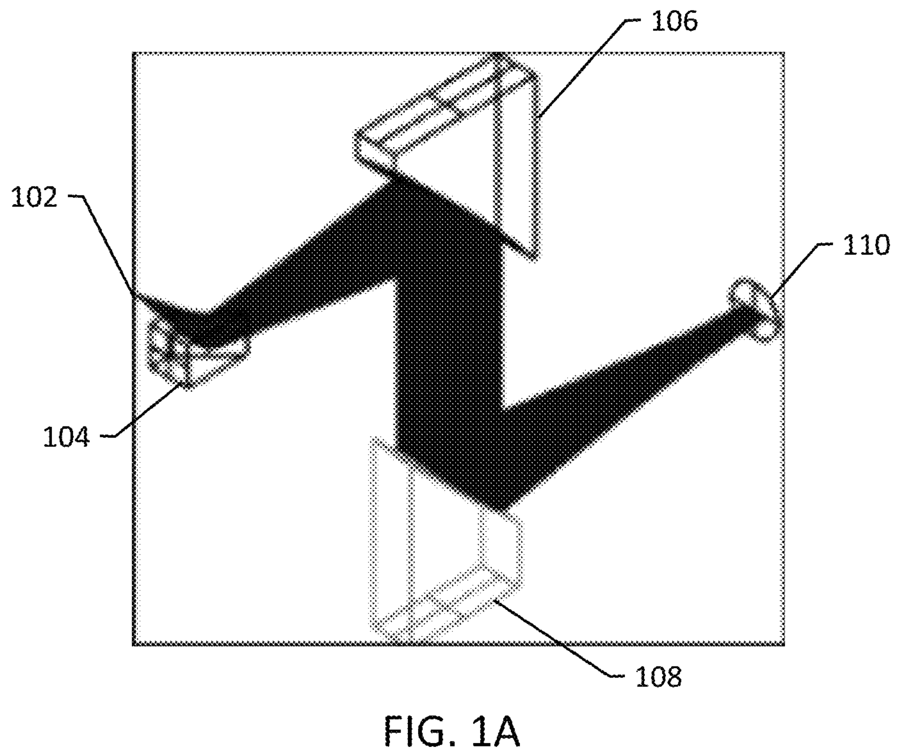
FIG. 1A is a block diagram illustrating the light path of a light beam in a first example illumination system.

This specification describes methods and systems for imaging a sample using fluorescence microscopy.

In some examples, the system combines single-molecule (SM) imaging with light sheet illumination. Titled light sheet illumination is described in U.S. Pat. No. 11,099,370, "Tilted illumination systems for fluorescence microscopes," which is hereby incorporated by reference in its entirety. U.S. Pat. No. 11,099,370 describes a light sheet microscope that can use Laterally Interfering, Tilted Excitation (LITE) imaging to image biological fluorophores in vivo. LITE technology combines the low-phototoxicity benefits of LFSM with high-resolution imaging made possible by high-NA oil-immersion lenses.

Typical SM microscopes employ a single objective lens and high intensity light to illuminate the entire sample simultaneously, resulting in unnecessary photodamage. In contrast, LSFM employs a secondary excitation path to create a thin sheet of laser light that illuminates the sample from the side. In doing so, only a small focal volume matched to the focal depth of the detection lens is illuminated. This powerful technique dramatically reduces light-dose and photodamage to the sample, as only a small proportion of fluorophores that are close to the focal plane are excited, while also limiting the amount of out-of-focus light that contributes to the final image. As a result, LFSM enables imaging of live samples for upwards of several days, allowing for a more detailed analysis of growth patterns over time.

Two sets of orthogonal objectives are required for most LSFM microscopes—one for generating the light sheet and one for fluorescence detection/image formation. This geometry introduces steric clashes between the sheet-generating and detection optics, thereby limiting the detection objectives to long-working-distance, low-NA lenses. Because LSFM typically requires low-NA objectives, the utility of LSFM for SM applications, which rely on high-NA objectives for their performance, remains largely unexplored.

LITE eliminates the need for a long working distance detection lens. By combining an interference pattern with an unconventional angled light path, LITE generates a long, uniform light sheet that can be placed in focus above any objective—including high-NA objectives previously incompatible with LSFM.

LITE can be effectively used to visualize fluorescent labels in a wide variety of model organisms—including animals, plants, and microbes—at high native spatial resolution, high speed, and with no observable phototoxic activity. LITE enables cell biologists to image without causing photodamage for far longer than with conventional modes of fluorescence microscopy, without sacrificing spatial resolution or detection efficiency. Thus, LITE allows biologists to observe practically any live, fluorescently labeled organism with unprecedented efficiency and resolution for previously unattainable periods of time.

LITE is an attractive platform for combining light sheets with SM imaging. By employing a high-powered laser with custom beam-shaping optics, the system and methods described in this document can be used to adapt LITE for use with SM applications (LITE-SM). This technology solves the two primary challenges of current SM techniques:

1. Due to the narrow focal volume of the LITE-SM beam, the light dose received by the sample will remain substantially lower than traditional SM imaging, reducing phototoxicity.
2. In addition, the unique ability for light sheets to selectively illuminate individual focal planes distant from the coverslip will allow for super-resolution of objects deeper in samples without contamination from out-of-focus fluorescence.

To expand LITE for LITE-SM, the systems and methods described in this document can be used to overcome two potential limitations of the previous design: chromatic aberrations and low laser power. Both were consequences of the use of a lens to generate the tilted light sheet illumination central to the conventional LITE technology. The LITE-SM design replaces both the collimator and cylindrical lens with a series of custom focusing mirrors to change the aspect ratio of the illumination light and concentrate power wasted outside of the field of view (FOV). Unlike refractive optics (lenses), reflective optics (mirrors) do not suffer from chromatic aberrations, and therefore, by replacing all lenses in LITE-SM with mirrors, chromatic shifts in light sheet focal lengths can be eliminated entirely. Mirrors are also less subject to power losses in transmitting light which further increases the available power at the sample. LITE-SM employs a higher-powered laser to increase power for acquisition times in the 10 s of milliseconds.

LITE-SM relies on off-axis parabolic mirrors. A parabolic mirror placed one focal length away from a point source of light will expand that point source to a perfectly collimated beam of light (focused to a point an infinite distance from the mirror). While a circular paraboloid will collimate light along both x and y axes, a cylindrical paraboloid will only collimate light along one axis. Therefore, a pair of cylindrical parabolic mirrors can be used to asymmetrically expand the light along the x and y axes, resulting in an elliptical, rather than circular, cross-section. By adjusting the relative positions and focal lengths of these asymmetric collimating mirrors, virtually any desired aspect ratio can be achieved. We can therefore maintain the required height of the beam while narrowing only its width. Because the power density changes proportionally with the x-y dimensions of the beam, a 10-fold linear compression of the beam along its x axis, for example, will result in 10-fold greater power across its cross-sectional area.

To generate the light sheet, a third cylindrical parabolic mirror replaces the current cylindrical lens. This mirror focuses the collimated beam only along its height, generating a focused line, or "sheet", of light used to illuminate the sample. Because the input beam is several times narrower, yet contains the same total power, the power within the LITE-SM sheet is significantly more concentrated at the sample. Again, because reflective optics introduce zero chromatic aberrations, the focal length of the light sheet is identical regardless of the illumination wavelength.

LITE's unique combination of light sheet illumination and high NA optics enables gentle, high-speed, high-resolution volumetric imaging of nearly any living sample for extended durations. Improvements to power throughput in LITE-SM will provide photon-efficient illumination of low abundance probes and single molecules, enable super-resolution deeper in cells, and open up new experimental space by enabling imaging durations orders of magnitude longer than those currently achievable.

For techniques such as dSTORM, "blinking" behavior of fluorophores relies on complex photophysics specific to each dye, and conventional SM imaging often bleaches a significant fraction of fluorophores before the first localization is detected. By increasing the photon efficiency of the illumination method, LITE-SM will greatly expand the utility of fluorophores that pair less favorably with current SM imaging—including fluorescent metabolic probes—as well as increase the number of localization events captured by even the best synthetic dyes. In addition, the tight focal volume illuminated by LITE-SM will greatly reduce out-of-focus light from images collected distant from the coverslip. This will enable super-resolution and SM tracking in thicker samples and complex three-dimensional colonies of organisms such as biofilms, host-microbe interactions, and plant/fungi symbiosis.

FIG. 1A is a block diagram illustrating the light path of a light beam in a first example illumination system. The light beam 102 originates from a light source, e.g., an optical fiber or other appropriate collimated illuminator. The light beam 102 encounters a first off-axis parabolic mirror 104 that collimates in the x-axis and then a second off-axis parabolic mirror 106 that collimates in the y-axis, followed by a photomask to create four primary light sheets, which are then focused by a third off-axis parabolic mirror 108 towards an objective lens 110.

Figure 2B:
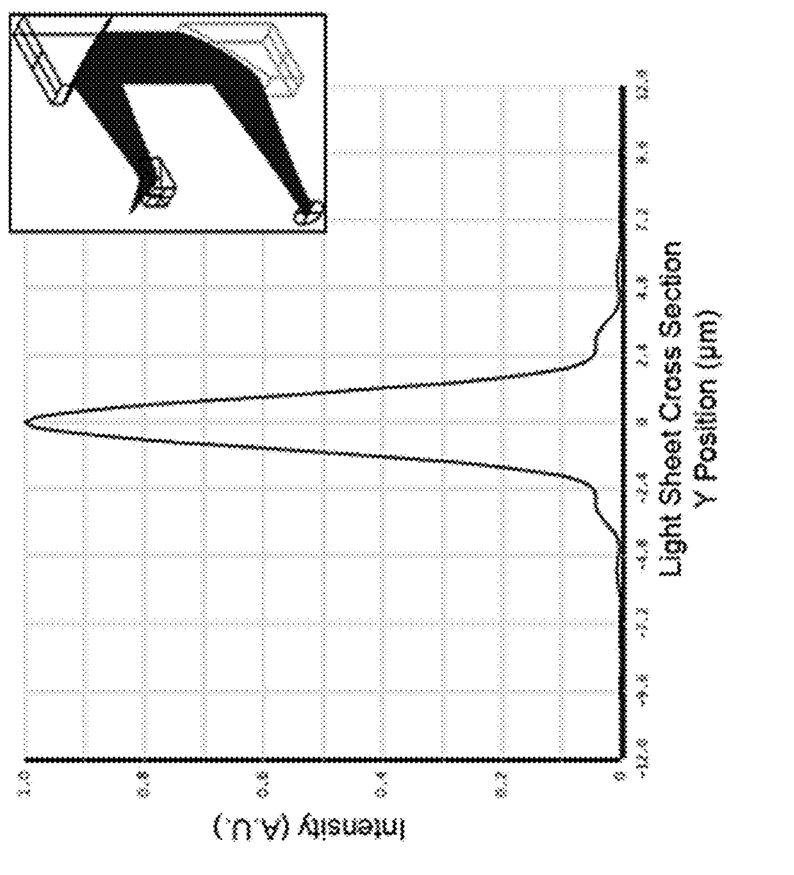
FIG. 2B shows an example intensity distribution for a system such as the one shown in FIG. 2B.
Figure 2A:
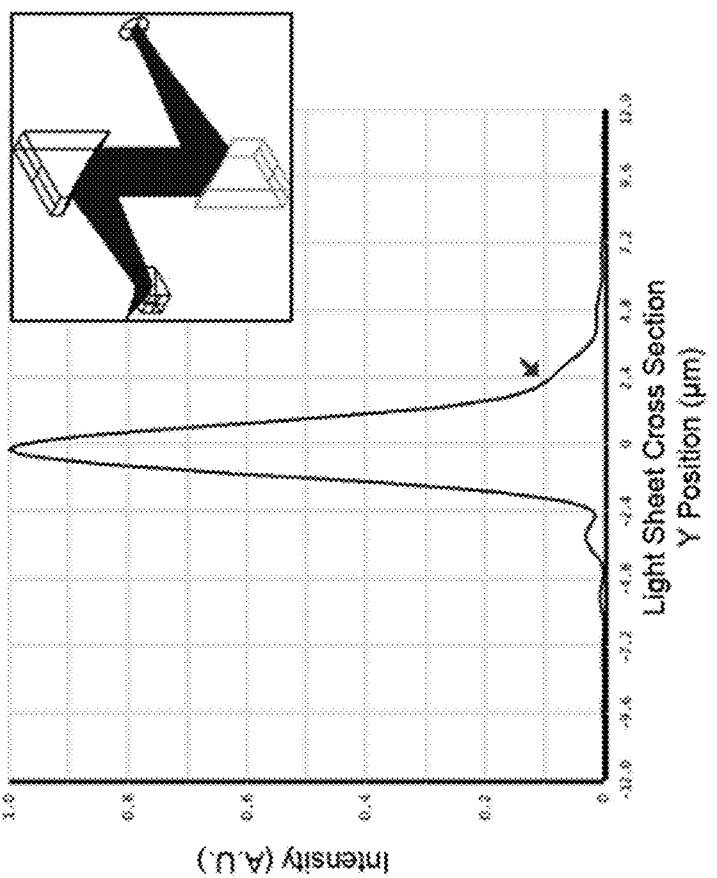
FIG. 2A show an example intensity distribution for a system such as the one shown in FIG. 1A.

As shown in FIG. 1A, the third (focusing) mirror 108 is oriented in line with the direction of light propagating. However, an asymmetric intensity distribution caused by the eccentric pupils of mirrors 106 and 108 may arise in the focusing light sheet. FIG. 2A show an example intensity distribution for a system such as the one shown in FIG. 1A.

Figure 1B:
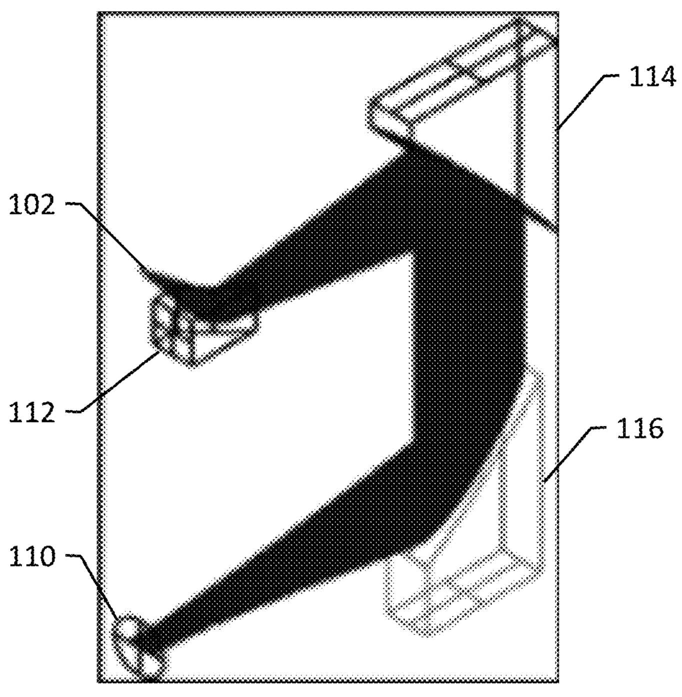
FIG. 1B is a block diagram illustrating the light path of a light beam in a second example illumination system.

FIG. 1B is a block diagram illustrating the light path of a light beam in a second example illumination system. The light beam 102 originates from a light source, e.g., an optical fiber or other appropriate collimated illuminator. The light beam 102 encounters a first off-axis parabolic mirror 112 that collimates in the x-axis and then a second off-axis parabolic mirror 114 that collimates in the y-axis, followed by a photomask to create four primary light sheets, which are then focused by a third off-axis parabolic mirror 116 towards the objective lens 110.

Compared to the illumination system shown in FIG. 1A, the third mirror 116 is turned 180° which results in folding the light path back upon itself. FIG. 2B shows an example intensity distribution for a system such as the one shown in FIG. 2B. As shown in FIG. 2B, the aberrations induced by the eccentric pupils were eliminated, resulting in a uniform beam profile.

Moreover, using the illumination system shown in FIG. 1B, the third mirror 116 can be identical or substantially identical to the second mirror 114, reducing the number of unique components necessary to the build while allowing for correction for eccentric pupils inherent to off-axis parabolas. The mirrors 114 and 116 are "substantially" identical, e.g., when they have the same dimensions except for minor defects that may arise during manufacturing.

Figure 3:
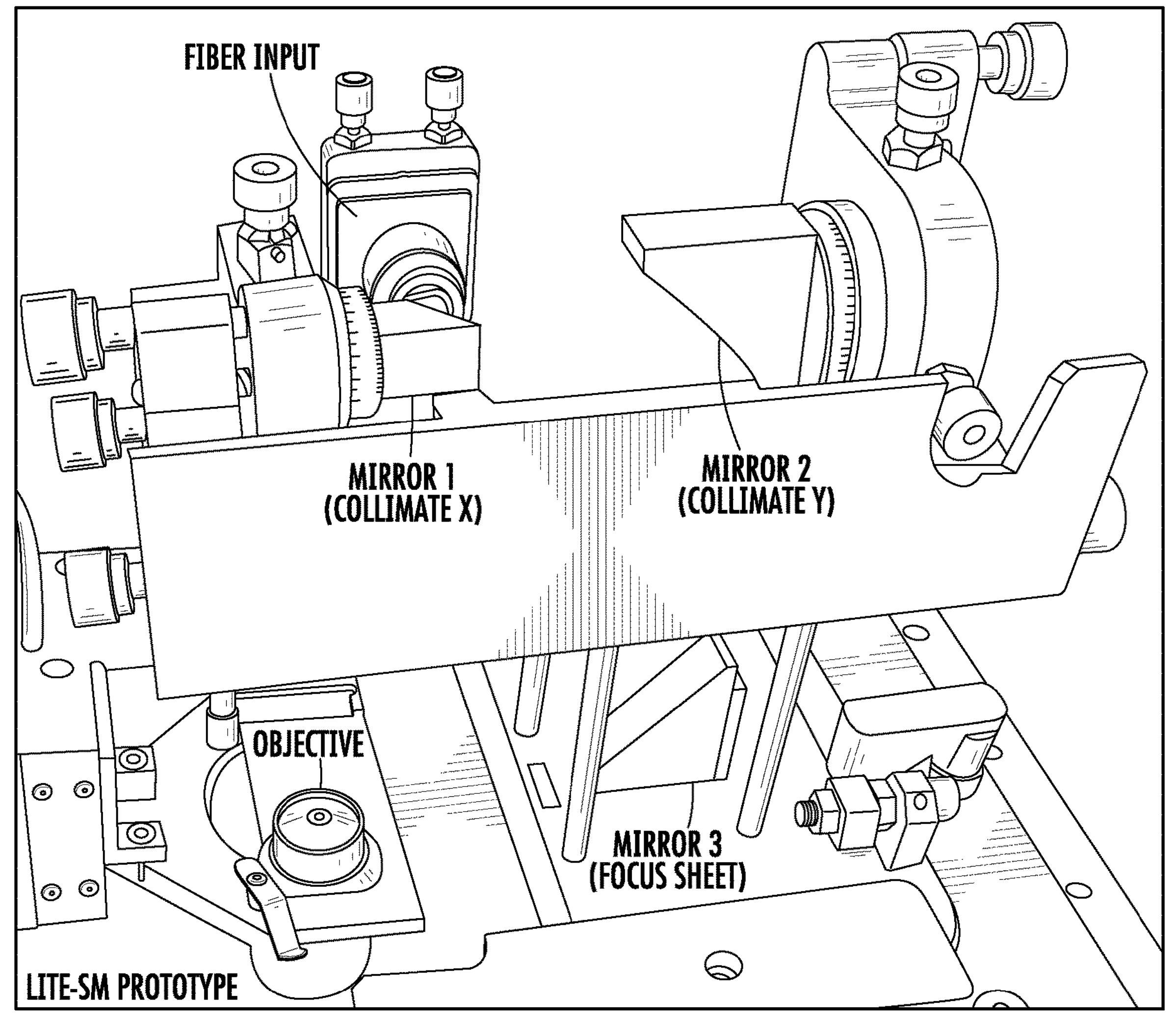
FIG. 3 shows a prototype LITE-SM system.

FIG. 3 shows a prototype LITE-SM system. The prototype is merely one example of an appropriate LITE-SM system. This document describes the prototype and testing performed on the prototype for purposes of illustration and not limitation.

As shown in FIG. 3, Mirror 1 consists of an off-axis parabolic trough mirror used to collimate light in one dimension and establish the light sheet width. Mirrors 2 and 3 are identical off-axis parabolic trough mirrors used to first collimate light in the second dimension, establishing the beam height, and then to refocus the beam down in a single dimension to a light sheet. Laser light is introduced via fiber optic at the focal length of Mirror 1. Mirror 1 collimates light along the x dimension, while the y dimension continues to expand. Mirror 2 is situated at its focal length relative to the fiber input and collimates light along the y dimension. An asymmetric (elliptical) collimated beam propagates to Mirror 3, which focuses a light sheet above the microscope objective.

Figure 4A:
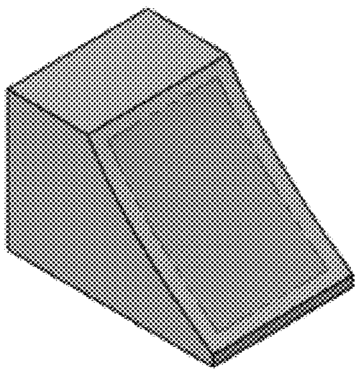
FIG. 4A shows an example off-axis parabolic trough mirror that can be used for Mirror 1.
Figure 4B:
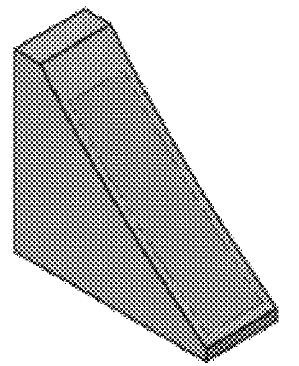
FIG. 4B shows an example off-axis parabolic trough mirror that can be used for Mirrors 2 and 3.

FIG. 4A shows an example off-axis parabolic trough mirror that can be used for Mirror 1. FIG. 4B shows an example off-axis parabolic trough mirror that can be used for Mirrors 2 and 3.

Figure 5:
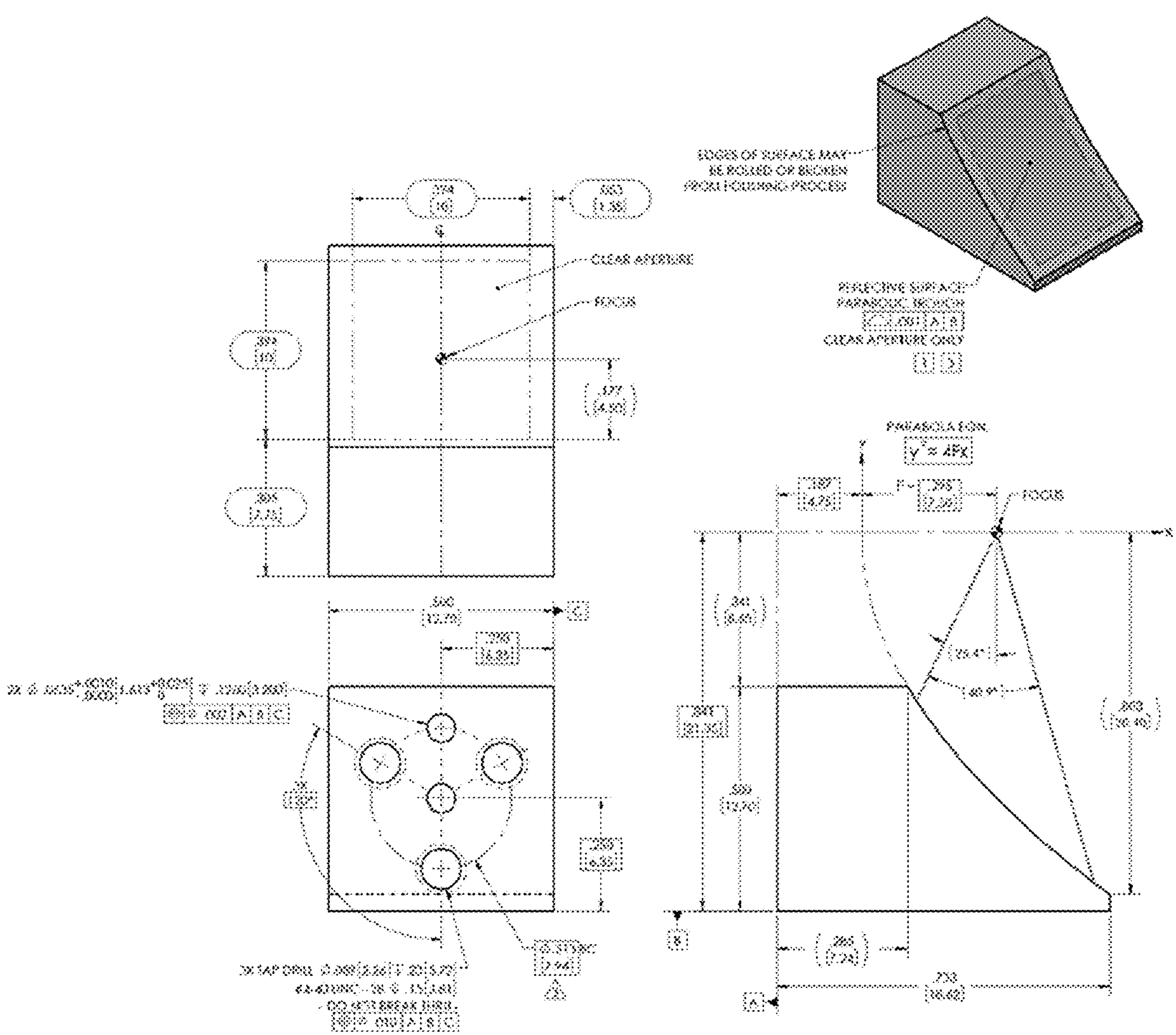
FIG. 5 shows further details for an example off-axis parabolic trough mirror that can be used for Mirror 1.
Figure 6:
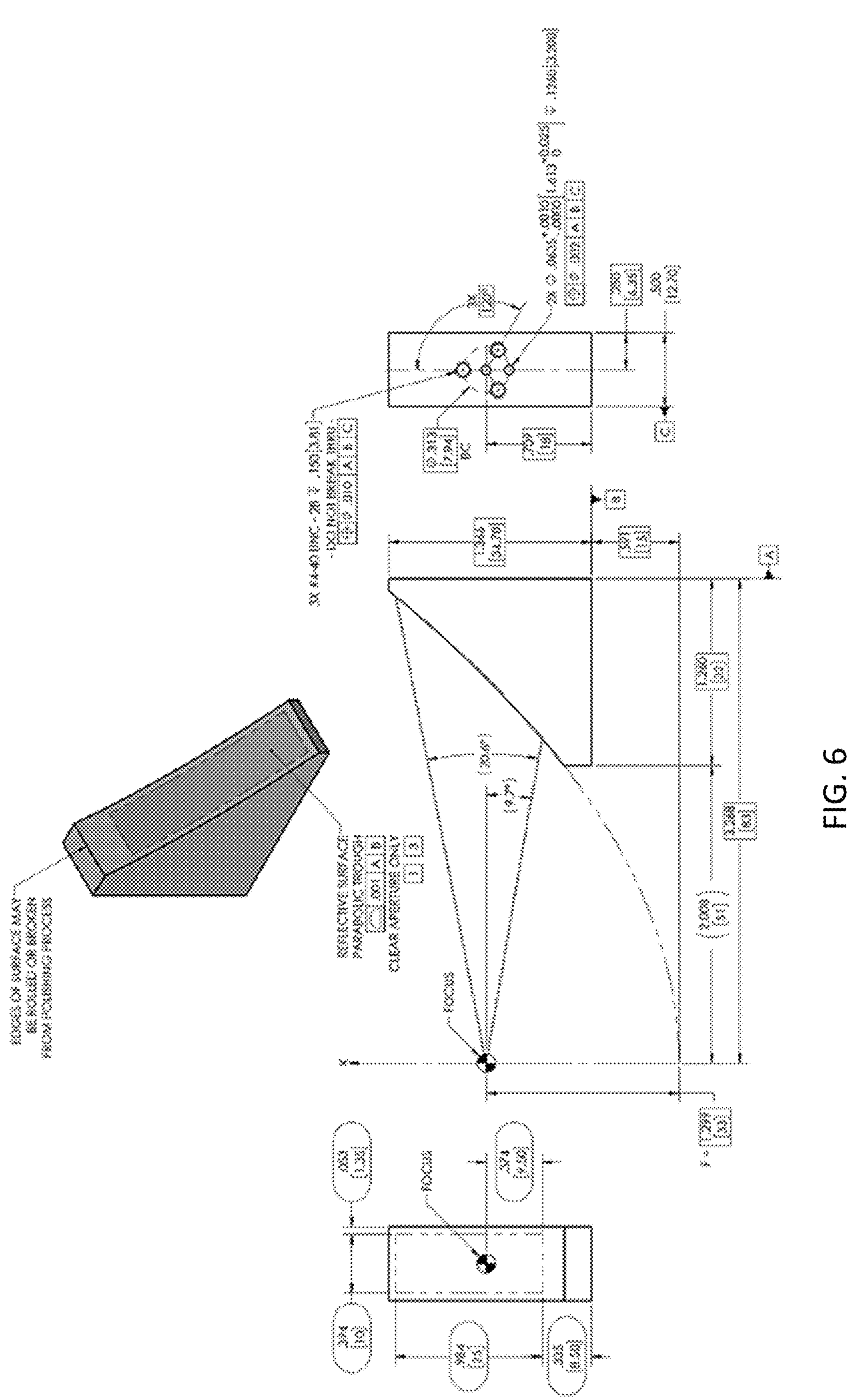
FIG. 6 shows further details for an example off-axis parabolic trough mirror that can be used for Mirrors 2 and 3.

FIG. 5 shows further details for an example off-axis parabolic trough mirror that can be used for Mirror 1. The dimensions shown in FIG. 5 are provided for purposes of illustration and not limitation. FIG. 6 shows further details for an example off-axis parabolic trough mirror that can be used for Mirrors 2 and 3.

To test the prototype, 488 nm and 640 nm lasers were used to generate light sheets and excite a dye solution containing both Fluorescein and Alexa-647. The LITE-SM system was benchmarked and compared against the original TILT system. Images of the resulting light sheets were captured from the side using a custom-built microscope equipped with a Nikon 10X objective.

Figures 7A, 7B, 8:
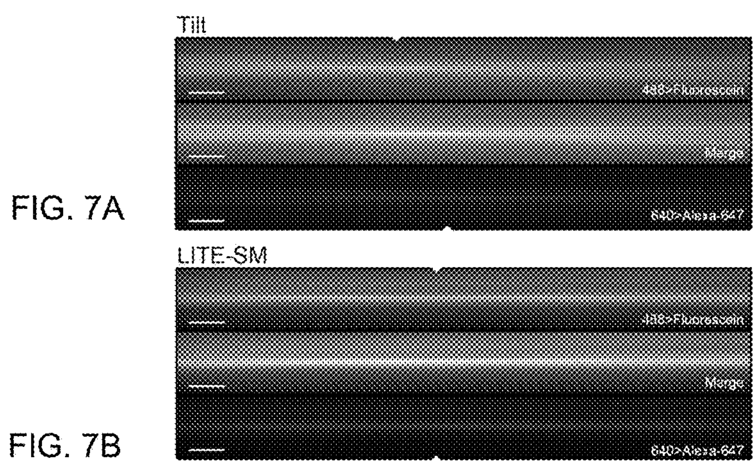
FIGS. 7A-7B illustrate the elimination of chromatic differences in light sheet focal length.
FIG. 8 is a table with the results for laser power output.

FIGS. 7A-7B illustrate the elimination of chromatic differences in light sheet focal length. FIG. 7A shows test results for the original TILT system and FIG. 7B shows test results for the LITE-SM system. While the original TILT system exhibited a noticeable chromatic focal shift of approximately 75.5 μm, the mirror-based LITE-SM had no measurable shift (FIG. 3), thus meeting our first pre-defined success metric.

Next, the laser power output was measured for both the TILT and LITE-SM at the focal point using a ThorLabs power meter. Power measurements were normalized to approximate (measured) light sheet beam width. FIG. 8 is a table with the results for laser power output. The results showed that the LITE-SM contained ~10.8-fold more power per unit area than the TILT, thus meeting our second pre-defined success metric.

The optical design of the LITE-SM was next evaluated by imaging of fixed and live biological specimens. Super resolution images were acquired with both the LITE-SM prototype and competing technologies for benchmarking. The images were analyzed for resolution and photodamage using established tools.

The LITE-SM system was compared to spinning disk confocal microscopy using the Halo fluorescent dye and fluorescent speckle microscopy (Halo-FSM) imaging of PtK1 cells, a commonly used model for studies of mitosis. Halo-FSM allows tubulin to be fluorescently tagged at a low enough concentration (picomolar) to see single molecules as spatially resolved "speckles". Halo-FSM via the spinning disk confocal resulted in significant photobleaching and phototoxicity, as evidenced by the stalled metaphase, collapse of the interkinetochore distance, and absence of kinetochore oscillations. In comparison, Halo-FSM imaging by the LITE-SM prototype permitted longer imaging durations without phototoxic effects, as evidenced by the transition from metaphase to anaphase, fluctuations in the interkinetochore distance, and periodic oscillations of the kinetochore. This demonstrates that LITE-SM reduces phototoxicity and photobleaching compared to spinning disk confocal microscopy, enabling longer imaging durations and reducing perturbations that interfere with biological activity.

Figure 9A:
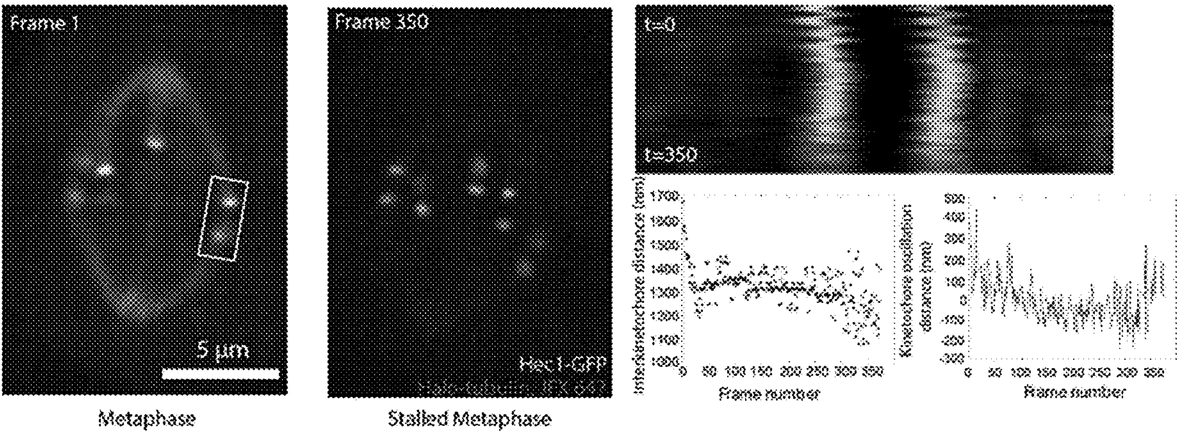
FIGS. 9A and 9B show the results of a comparison of Halo-FSM imaging of mitotic PtK cells by spinning disk confocal and LITE-SM prototype.
Figure 9B:
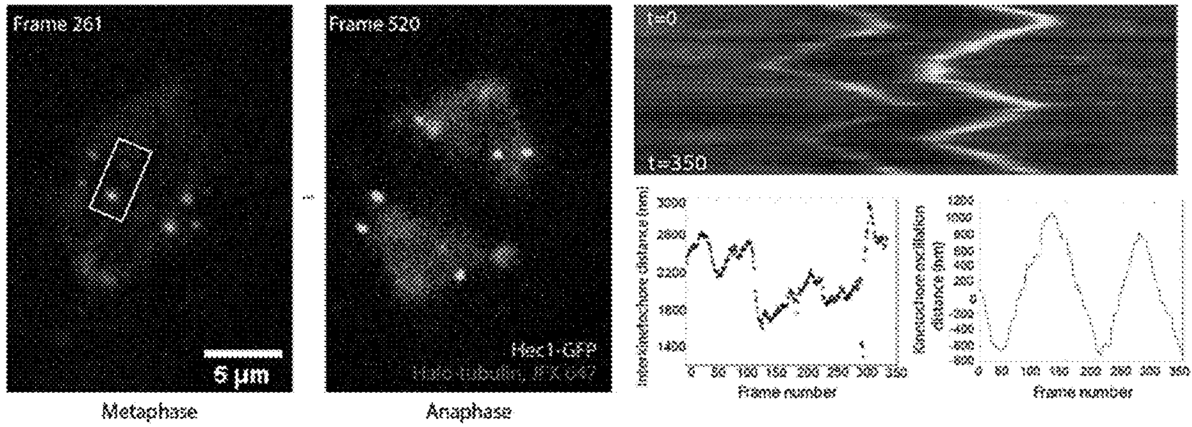

FIGS. 9A and 9B show the results of a comparison of Halo-FSM imaging of mitotic PtK cells by spinning disk confocal and LITE-SM prototype. FIG. 9A shows Halo-FSM imaging by spinning disk confocal results in significant photobleaching and phototoxicity as evidenced by the stalled metaphase, collapse of the interkinetochore distance, and absence of kinetochore oscillations. Scale=5 μm, image interval=3.6 sec. FIG. 9B shows Halo-FSM by LITE-SM permits longer imaging durations without phototoxic effects as evidenced by the transition from metaphase to anaphase, fluctuations in the interkinetochore distance, and periodic oscillations of the kinetochore. Scale=5 μm, image interval=1.15 sec. White boxes outline the kinetochore pair highlighted in each kymograph.

Figure 10A:
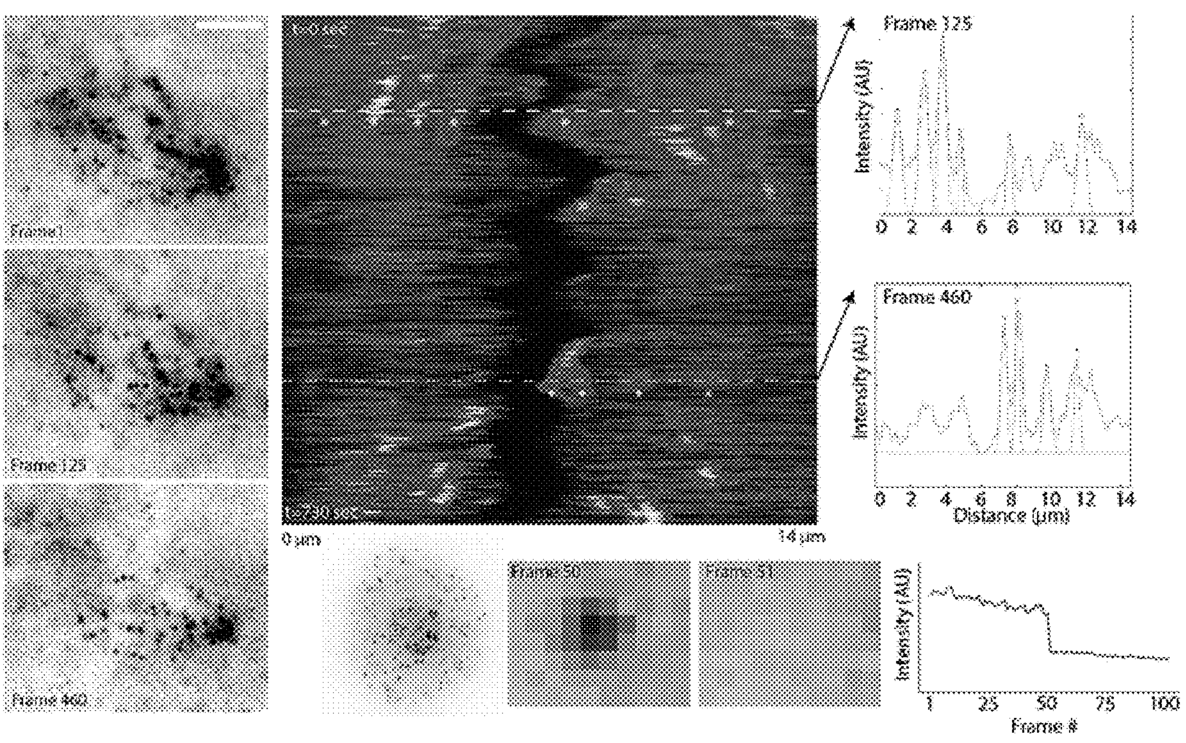
FIGS. 10A and 10B show a comparison of SM imaging with the LITE-SM system.
Figure 10B:
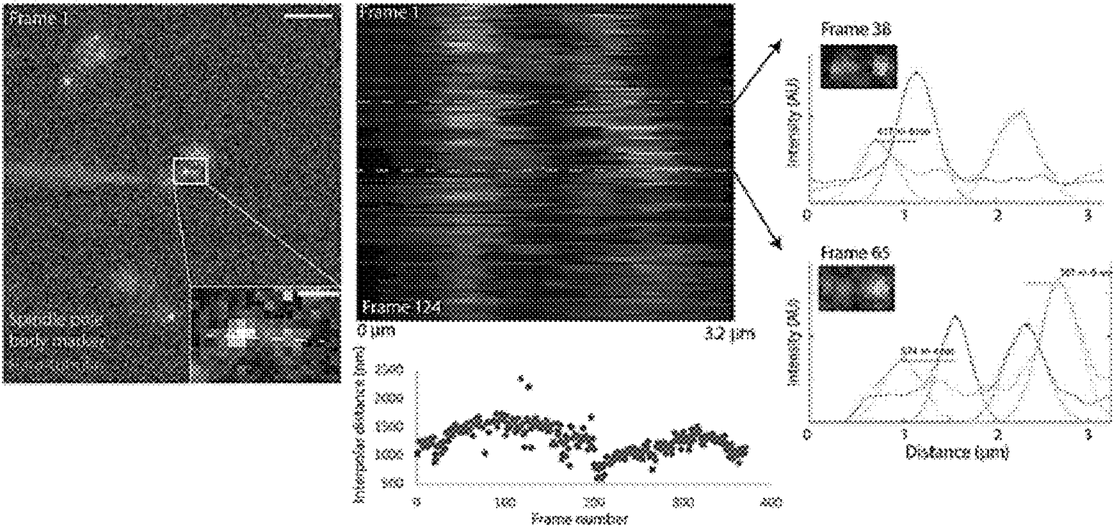

To confirm the ability of the LITE-SM to perform SM imaging, PtK1 cells labeled with Halo-tubulin were imaged for over 10 minutes using the LITE-SM prototype. FIGS. 10A and 10B show a comparison of SM imaging with the LITE-SM system.

The resulting images captured tubulin movement over time (FIG. 10A). The presence of single molecules was verified by photobleaching analysis of formaldehyde-fixed cells. In addition, budding yeast cells were labeled with Halo-tubulin and a spindle pole body marker and imaged for over 10 minutes. In FIG. 10B, plots for frames 38 and 65 are highlighted to show a single tubulin speckle between the poles and two well-resolved tubulin speckles, respectively. Interpolar distance is also plotted as a function of frame number to determine cell cycle timing. These analyses confirm the ability of the LITE-SM to resolve and track single molecules in cells for extended durations.

The ability of the LITE-SM to perform super-resolution direct Stochastic Optical Reconstruction Microscopy (dSTORM) was tested. dSTORM is a widely used technique for imaging of single molecules that relies on the stochastic activation of individual photoactivatable fluorophores. During dSTORM, individual fluorophores "blink" by random activation between "on" and "off" states. Images are captured over time until most fluorophores have been imaged. Individual molecules can be precisely localized by reconstructing their coordinates from the photons detected for each activation event.

Figure 11:
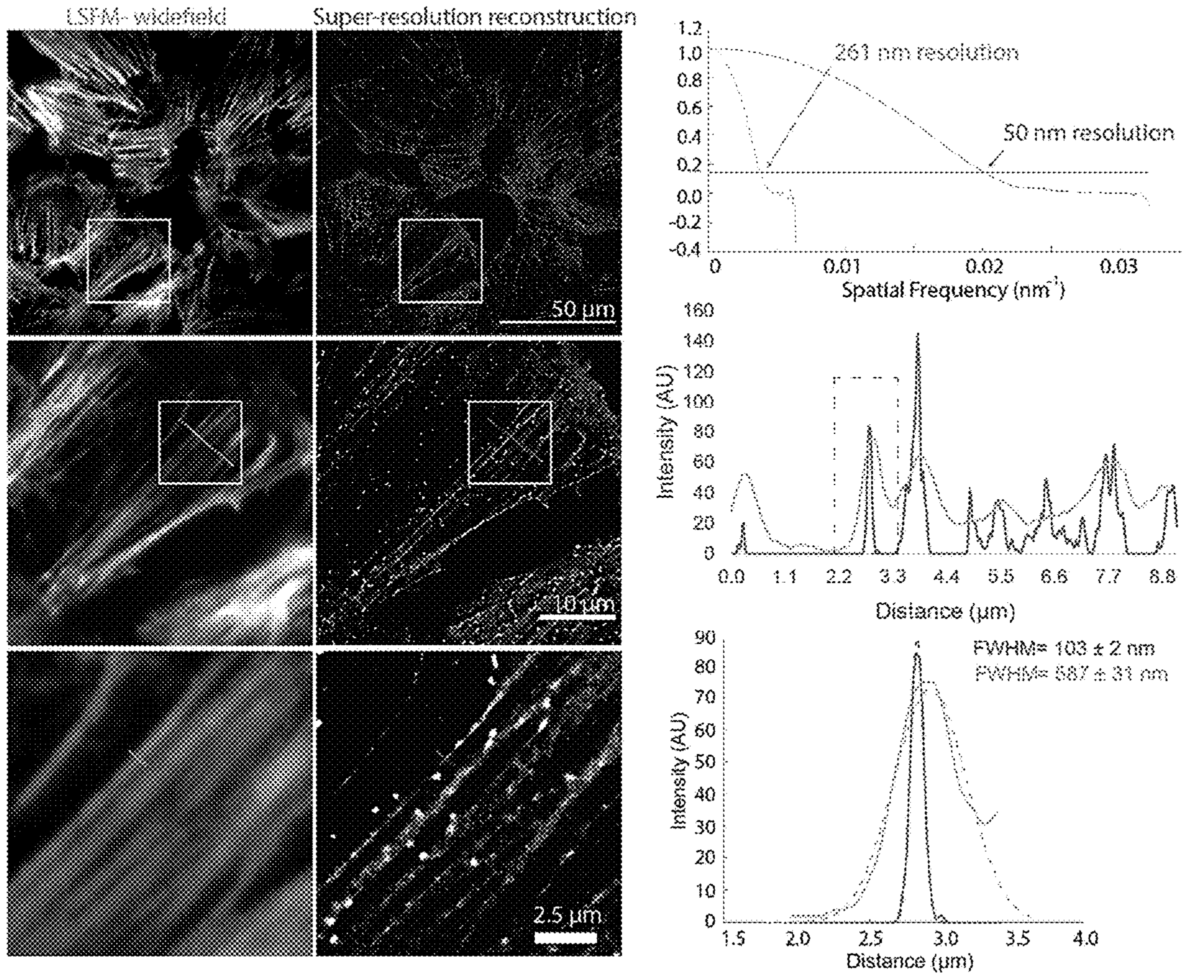
FIG. 11 illustrates super-resolution reconstruction from the LITE-SM system.

To test the ability of LITE-SM to be used for dSTORM, we imaged fixed PtK1 cells labeled with phalloidin-Alexa647. FIG. 11 illustrates super-resolution reconstruction from the LITE-SM system.

Laser power was set to 525 mW to induce blinking, and cells were imaged continuously for 3877 frames at an exposure of 25 ms. Reconstructed images were generated using the ThunderSTORM ImageJ plugin. A series of images (300 frames) acquired by widefield LSFM prior to blinking were maximum intensity projected and used for comparison. Fourier Ring Correlation (FRC) analysis determined the resolutions for the widefield LSFM image and super-resolution reconstruction to be 261 nm and 50 nm, respectively. A linescan across a group of actin filaments highlights the increased resolution. The full width at half maximum (FWHM) of a single filament fit to a Gaussian curve decreased from 587 nm (±31 nm) in the LSFM image to 103 nm (±2 nm) in the super-resolution reconstruction. This demonstrates the ability of the LITE-SM to capture dSTORM images at super-resolution.

Figure 12A:
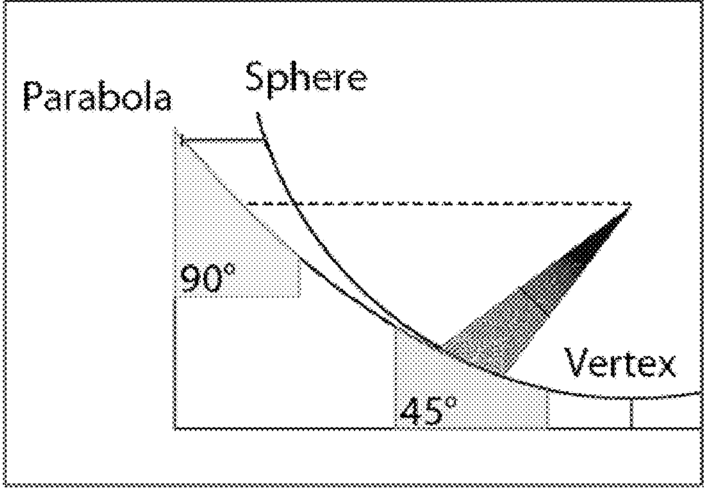
FIGS. 12A and 12B show an alternative configuration of the LITE-SM system.
Figure 12B:
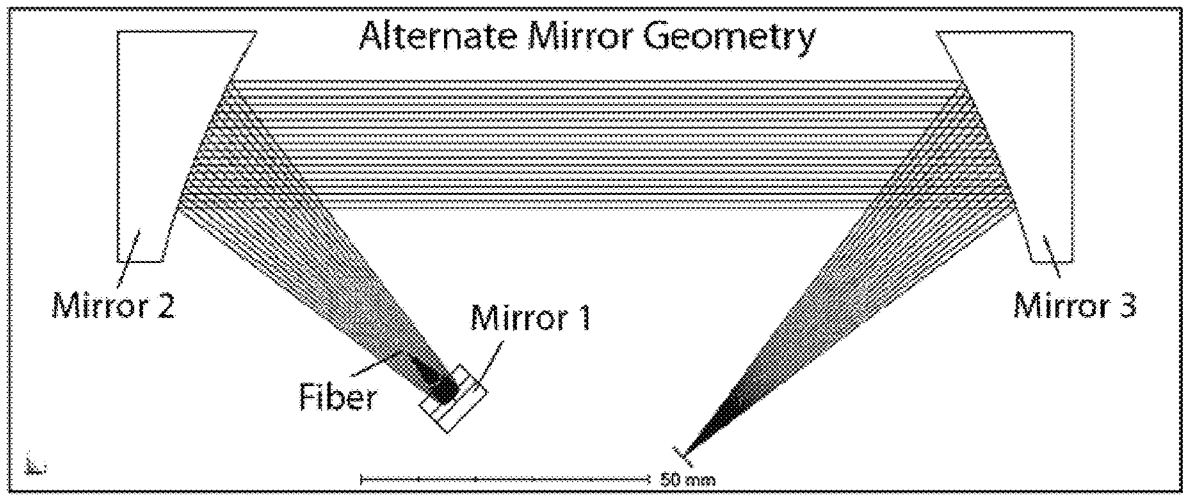

FIGS. 12A and 12B show an alternative configuration of the LITE-SM system. In the prototype described above, the mirrors were arranged at 90° angles. This required the mirrors to be derived from the upper part of the parabola as shown in FIG. 12A.

In the alternative configuration, the mirrors are arranged at 45° angles instead of 90° angles, e.g., as shown in FIG. 12B. This enables use of the area of the parabola near the vertex, as shown in FIG. 12A. Mirrors derived from this area are generally easier to manufacture, since this shape more closely approximates a sphere and it is more common for mirror manufacturers to make parabolas closer to the vertex (e.g. for use in telescopes). This may be useful, e.g., to reduce the costs associated with building the system.

The LITE technology, in some examples, uses a photomask to create an interference pattern that lengthens the narrow beam "waist" of the light sheet. The photomask can be designed to achieve the same desired effect using the newly designed mirrors. In some examples, the four interfering primary light sheets also have other effects, e.g., as a result of the photomask being configured such that the two of the primary light sheets are the first harmonic of the two middle ones. The interference pattern created by this can have a beneficial effect, i.e., in that it creates a pseudo or quasi-non-diffracting beam. Other photomasks can be used to create other effects, for instance, to create moire patterns or other forms of structured illumination.

In some examples, the system can incorporate a planar raster scanning mirror in order to provide more even illumination and reduce shadowing artifacts. For example, this can be a resonant mirror in the light path that resonates at 100-400 times per second, allowing the light sheet to move rapidly side to side. This reduces shadowing by providing illumination from multiple angles. This mirror can also be used to introduce a photomask or polarizer module, further enhancing the utility of the LITE-SM system.

Figure 13A:
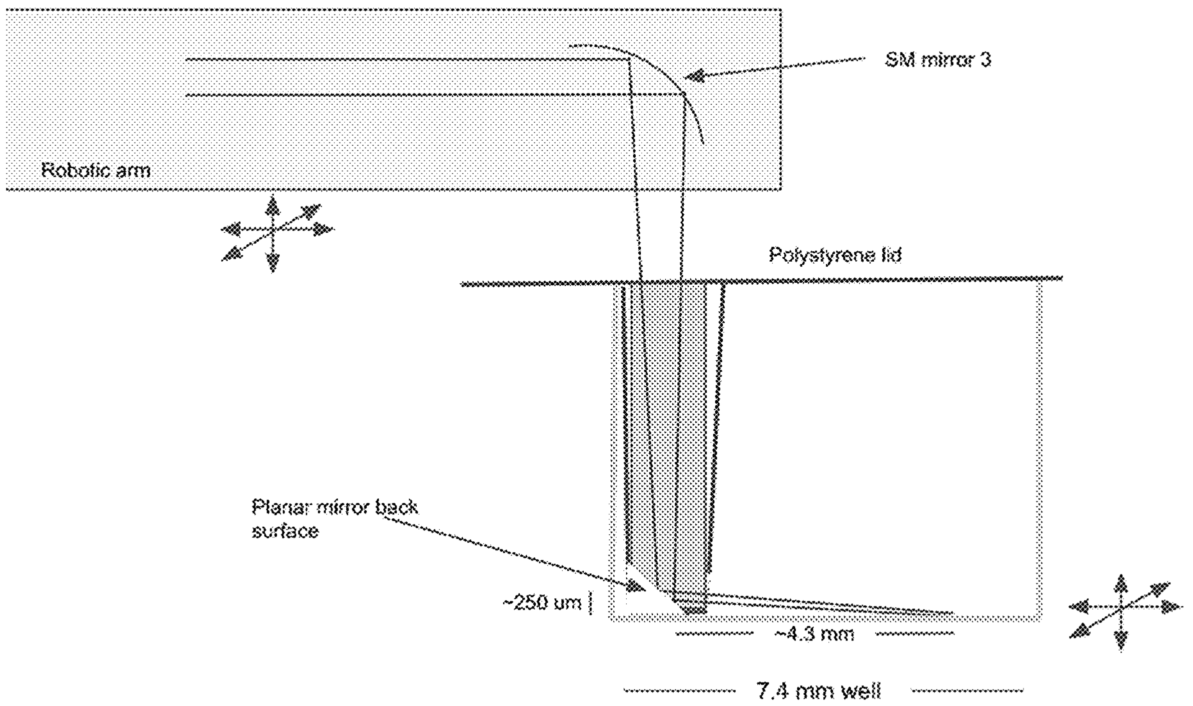
FIGS. 13A and 13B show an example system that can be used with the LITE-SM imaging technology for imaging a multi-well plate.
Figure 13B:
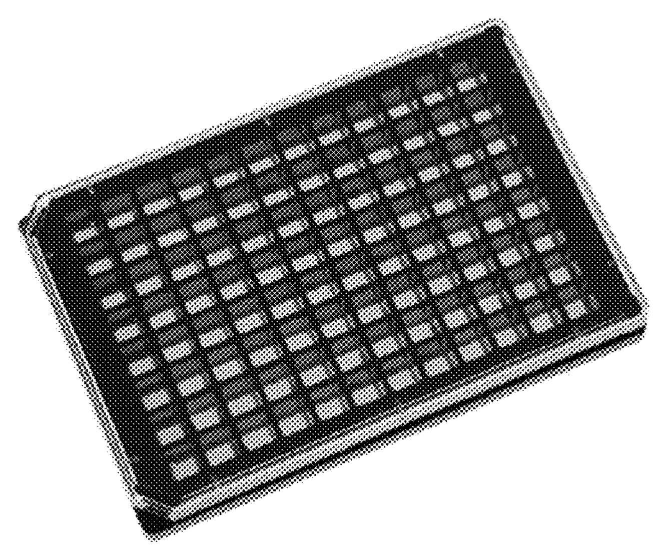

FIGS. 13A and 13B show an example system that can be used with the LITE-SM imaging technology for imaging a multi-well plate, e.g., a 96-well plate. The system can include a robotic arm for handling plates and liquid handling. Each well can have a piece extruding into it that has a single fixed planar mirror and a window to let out the lightsheet illuminator above, with x,y,z and tilt movements. The plate and the lid can move on a state, such that the illuminator can stay fixed relative to the objective and make slight x,y,z movements to adjust the sheet.

Figure 14:
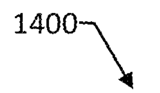
FIG. 14 is a block diagram of an example illumination system including a plurality of lightsheet illuminators.
Figure 14:
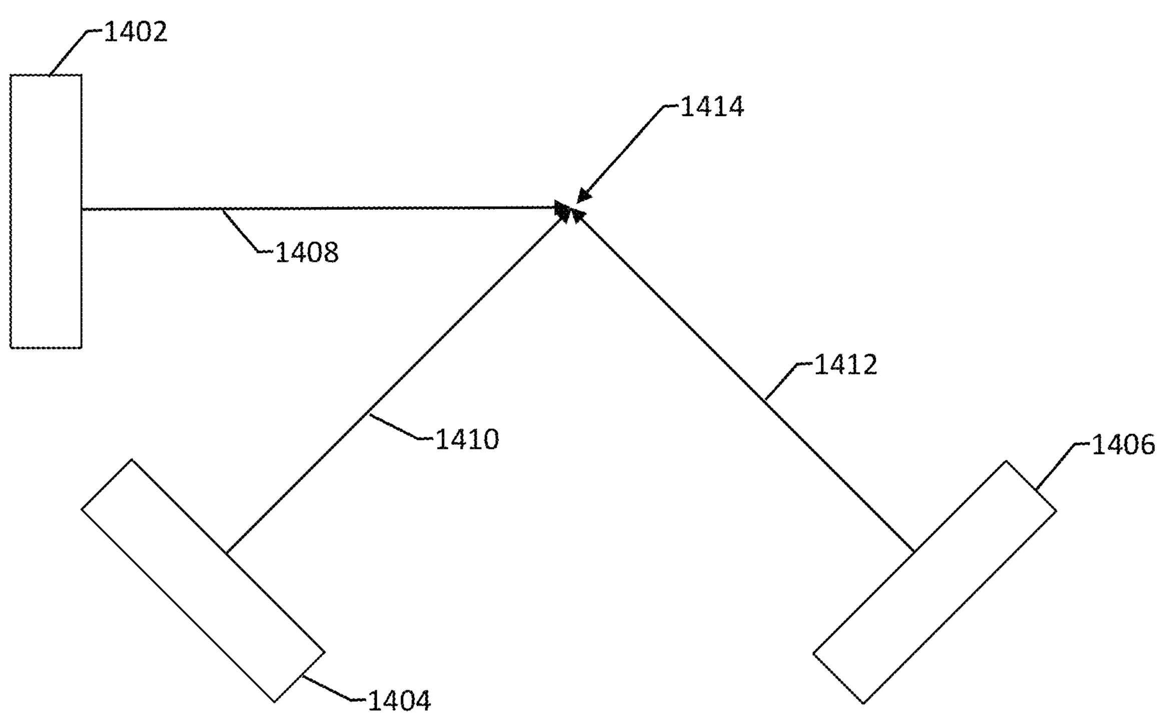

FIG. 14 is a block diagram of an example illumination system 1400 including a plurality of lightsheet illuminators 1402, 1404, and 1406. The illumination system 1400 can be used with the mirrored light sheet imaging systems described above. Each of the lightsheet illuminators 1402, 1404, and 1406 produces a respective light sheet 1408, 1410, and 1412, each of which converges on or about a target 1414. The target 1414 can be a field of view, a sample viewing area, i.e., an area where the converging light sheets create an interference pattern, such as a moiré pattern.

A moiré pattern is a type of visual interference pattern that occurs when two similar patterns are overlaid or superimposed on each other with a slight angle or displacement. The resulting pattern is a new and complex pattern that may appear as a series of dark and light lines, curves, or circles, depending on the orientation and spacing of the original patterns.

Having light coming from multiple angles can create desirable effects, such as the ability to do super-resolution imaging (a way to increase resolution beyond the theoretical diffraction limit). For instance, with three illuminators 1402, 1404, and 1406 the system can be configured to create moiré patterns (e.g., as in structural illumination microscopy, or SIM).

Super-resolution imaging is a technique that allows for the creation of high-resolution images from low-resolution data. Super-resolution imaging can include using mathematical algorithms, on a computer system, to recover fine details that are lost in the low-resolution data. For example, a computer system can capture multiple low-resolution images of the same object, each taken from a slightly different angle or with a slightly different focus. By combining the information from these images, it is possible to create a high-resolution image that has more detail than any of the individual low-resolution images.

Creating moiré patterns allows the user to define a smaller point-spread function (PSF). This works for both the lateral and axial PSF. The illumination system 1400 can also, in some examples, include more than three illuminators to get an additional effect in both lateral and axial dimensions. This can also reduce shadowing, as the light sheets 1408, 1410, and 1412 are coming in from different angles.

This method of making structured illumination (including the moiré patterns) is distinct from the way some conventional systems make these patterns for SIM, namely by using photomasks. Instead, the illumination system 1400 uses converging light sheets 1408, 1410, and 1412. This provides the normal benefits of light sheet imaging, i.e., it is very gentle and allows for longer duration and higher frequency imaging of living biological samples.

In the example shown in FIG. 14, the illumination system 1400 includes three converging light sheets 1408, 1410, and 1412 converging at 60 degrees relative to each other to create a pattern similar to conventional SIM. More generally however, any number of converging light sheets coming in at any number of angles can be used for different purposes and benefits.

Another benefit of using independent light sheet illuminators to produce SIM is that the system can potentially use any NA objectives. Standard SIM illuminators are the microscope objective, and there is therefore little or no flexibility in changing the illuminator NA. The approach using multiple illuminators 1402, 1404, and 1406 allows the user to change the NA of the illuminator to something very high or very low, or anything in between. A high NA for the illuminator will in theory increase resolution.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for imaging a sample using fluorescence microscopy, the method comprising:

propagating a light beam into an illumination system comprising a plurality of mirrors, and using the plurality of mirrors to form a light sheet from the light beam such that a propagation axis of the light sheet is at an oblique angle relative to an imaging axis of an objective lens when the light sheet reaches a sample viewing area, wherein propagating the light beam comprises propagating the light beam onto a first off-axis parabolic mirror and collimating the light beam in a first axis;

illuminating a sample using the light sheet; and imaging the sample through the objective lens.

2. The method of claim 1, wherein propagating the light beam comprises propagating the light beam onto a second off-axis parabolic mirror and collimating the light beam in a second axis.

3. The method of claim 2, wherein propagating the light beam comprises propagating the light beam onto a photomask and creating a plurality of primary light sheets.

4. The method of claim 3, wherein the photomask comprises a quadruple-slit photomask shaped for elongating the light sheet by creating an interference pattern.

5. The method of claim 3, wherein propagating the light beam comprises propagating the primary light sheets onto a third off-axis parabolic mirror, causing the primary light sheets to converge towards the objective lens.

6. The method of claim 5, wherein the third off-axis parabolic mirror is substantially identical to the second off-axis parabolic mirror, and wherein propagating the primary light sheets onto the third off-axis parabolic mirror comprises folding a light path back upon itself and creating a substantially uniform beam profile.

7. The method of claim 1, wherein propagating the light beam comprises originating the light beam from a collimated illuminator.

8. The method of claim 7, wherein the collimated illuminator comprises a laser source emitting a radially symmetric, Gaussian beam and a collimator.

9. The method of claim 1, wherein imaging the sample comprises observing the sample by eye or camera, using pre-existing light paths within a standard upright or inverted research-grade microscope.

10. A method for imaging a sample using fluorescence microscopy, the method comprising:

propagating a light beam into an illumination system comprising a plurality of mirrors, and using the plurality of mirrors to form a light sheet from the light beam such that a propagation axis of the light sheet is at an oblique angle relative to an imaging axis of an objective lens when the light sheet reaches a sample viewing area;

illuminating a sample using the light sheet;

imaging the sample through the objective lens;

illuminating the sample using one or more additional light sheets converging on the sample from one or more different angles with respect to the sample; and forming a moiré pattern on the sample using the light sheet and the one or more additional light sheets.

11. A system for imaging a sample using fluorescence microscopy, the system comprising:

an objective lens;

a light source configured to propagate a light beam; and an illumination system comprising a plurality of mirrors, wherein the illumination system is oriented for propagating the light beam by forming, using the plurality of mirrors, a light sheet from the light beam such that a propagation axis of the light sheet is at an oblique angle relative to an imaging axis of the objective lens when the light sheet reaches a sample viewing area, wherein propagating the light beam comprises propagating the light beam onto a first off-axis parabolic mirror and collimating the light beam in a first axis.

12. The system of claim 11, wherein propagating the light beam comprises propagating the light beam onto a second off-axis parabolic mirror and collimating the light beam in a second axis.

13. The system of claim 12, wherein propagating the light beam comprises propagating the light beam onto a photomask and creating a plurality of primary light sheets.

14. The system of claim 13, wherein the photomask comprises a quadruple-slit photomask shaped for elongating the light sheet by creating an interference pattern.

15. The system of claim 13, wherein propagating the light beam comprises propagating the primary light sheets onto a third off-axis parabolic mirror, causing the primary light sheets to converge towards the objective lens.

16. The system of claim 15, wherein the third off-axis parabolic mirror is substantially identical to the second off-axis parabolic mirror, and wherein propagating the primary light sheets onto the third off-axis parabolic mirror comprises folding a light path back upon itself and creating a substantially uniform beam profile.

17. The system of claim 11, wherein the light source comprises a collimated illuminator.

18. The system of claim 17, wherein the collimated illuminator comprises a laser source emitting a radially symmetric, Gaussian beam and a collimator.

19. The system of claim 11, comprising a camera configured for imaging the sample.

20. A system for imaging a sample using fluorescence microscopy, the system comprising:

an objective lens;

a light source configured to propagate a light beam; and an illumination system comprising a plurality of mirrors, wherein the illumination system is oriented for propagating the light beam by forming, using the plurality of mirrors, a light sheet from the light beam such that a propagation axis of the light sheet is at an oblique angle relative to an imaging axis of the objective lens when the light sheet reaches a sample viewing area;

one or more additional illuminators configured for illuminating the sample using one or more additional light sheets converging on the sample from one or more different angles with respect to the sample, wherein illuminating the sample using one or more additional light sheets comprises forming a moire pattern on the sample using the light sheet and the one or more additional light sheets.

* * * * *